INVENTOR.
RICHARD S. KAMPF
BY Arthur H. Swanson
ATTORNEY.

May 18, 1965  R. S. KAMPF  3,184,751
RECORDER
Filed Nov. 27, 1962  4 Sheets-Sheet 3

INVENTOR.
RICHARD S. KAMPF
BY Arthur H. Swanson
ATTORNEY.

May 18, 1965

R. S. KAMPF 3,184,751

RECORDER

Filed Nov. 27, 1962

INVENTOR.
RICHARD S. KAMPF
BY
Arthur H. Swanson
ATTORNEY.

United States Patent Office 3,184,751
Patented May 18, 1965

3,184,751
RECORDER
Richard S. Kampf, Denver, Colo., assignor to
Honeywell Inc., a corporation of Delaware
Filed Nov. 27, 1962, Ser. No. 240,307
4 Claims. (Cl. 346—108)

This invention relates to means for making a substantially immediately visible, substantially permanent record by means of a high-speed oscillograph in which a record is made on recording paper by means of beams of radiant energy. Such a record, when made, is substantially invisible but becomes visible after a short "access time," which is the time interval between the exposure of the recording paper to the recording beam of radiant energy and the presentation of the record or trace for visual observation. This "access time" may be shortened and controlled by "latensification," which comprises exposing the recording paper to radiant energy of suitable composition for a suitable time. The spectral composition may vary over one or more bands of wave lengths and includes visible light and invisible light including infra-red or ultra-violet radiations.

Means for making these substantially immediately visible, substantially permanent records is disclosed in U.S. Patent 2,580,427; patented January 1, 1952, to C. A. Heiland. One process of latensification is disclosed in U.S. Patent 3,035,912; patented May 22, 1962, to Robert A. Le Massena and Richard S. Kampf.

Means for loading a supply roll of recording paper into an oscillograph, for bringing the surface of the recording paper into contact with a drive roller, and for driving the recording paper over a recording platen while making a record on the paper are disclosed in co-pending application of K. R. Johnson; Serial No. 166,062; filed January 15, 1962, now Patent No. 3,139,320. These means may be employed in combination with the paper take-up mechanisms of this invention.

An object of this invention is to provide means for latensifying the recording paper, including: a paper take-up device which maintains a constant, low-level tension in the paper as it is being spooled, regardless of paper speed and/or diameter of the spool on which the paper is being wound, with a minimum of change in tension during acceleration or deceleration.

A more specific object of this invention is to provide paper take-up means having mechanical amplification so that a small input force can control the application of a much larger output force.

An additional object of this invention is to provide means for making a substantially immediately visible, substantially permanent record, including, a rack, means for producing one or more beams of radiant energy, a supply roll of recording paper, means for moving said beam of radiant energy and said paper relative to each other whereby said beam produces a trace on said paper, a first drawer slideably mounted in said rack and supporting said supply roll of recording paper and said above-mentioned means, a paper take-up device adapted for spooling up said recording paper on it after a record has been made on said recording paper, a second drawer slideably mounted in said rack and supporting said paper take-up device, and a latensifying platen mounted to receive said recording paper as it moves from the recording location and to guide said recording paper to said paper takeup device.

Still more specifically, it is an object of this invention to provide means for latensifying the recording paper in combination with a paper take-up device comprising, a motor, a slip clutch comprising a driving pulley or drum driven by said motor and a belt which is driven by and slips on said drum, a paper take-up spool driven by said belt, an idler roller bearing on and responsive to the tension of the paper winding upon said spool, a linkage on which said idler roller is pivotally mounted, a control pulley pivotally mounted by said linkage and bearing on the slack side of said belt, and a spring biasing said linkage against the tension of the paper applied to the idler roller so that changes in the tension of the paper move the control pulley toward or away from the belt and thereby cause the clutch to slip more or less. An increase in the tension of the paper causes the control pulley to move away from the belt to reduce the torque transmitted by the belt.

A further object of this invention is to provide a second idler roller engaging the paper between the first idler roller and the paper take-up spool so as to prevent a change in the angle the paper takes as it comes off the first idler roller and winds up on the spool.

Yet another object of the invention is to provide means for increasing the contact of the belt with the driving pulley. This is done by providing a third idler roller contacting the tight side of the belt between the paper take-up spool and the driving pulley so as to insure that the belt engages with a sufficient portion of the rim of the driving pulley, the belt and the driving pulley cooperating to provide a slip clutch. The wrap of the belt around the driving pulley consequently increases the capstan effect.

One embodiment which this invention may take, together with modifications thereof, is disclosed in the following description and drawings, in which.

The radiant energy used for recording may include bands of wavelengths between 3000 Angstrom units (hereinafter abbreviated A.) and 4000 A.

Figure 1:
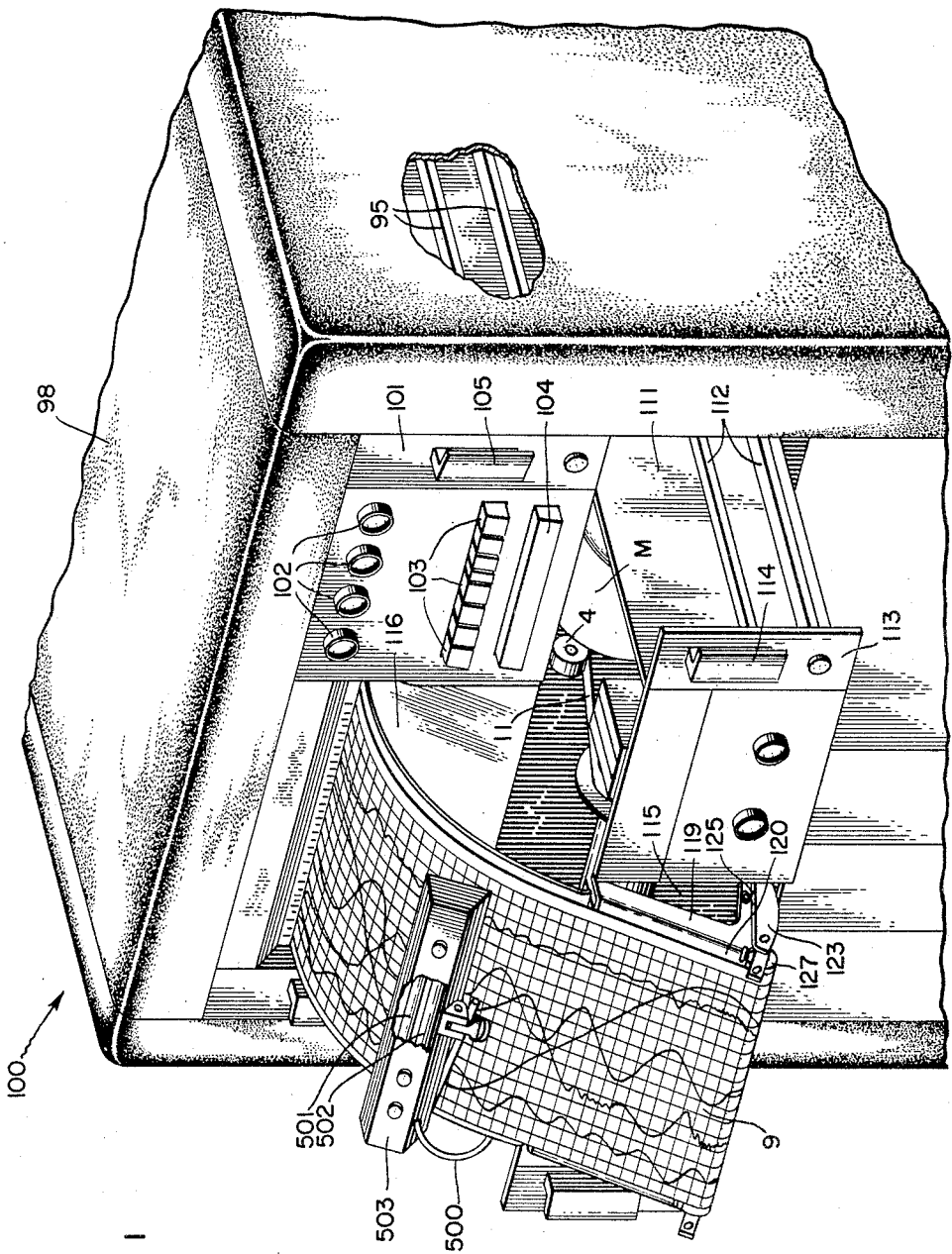
FIG. 1 is a perspective view of recording means, latensifying means, and paper take-up means. The latensifying means may be omitted and the paper passed directly to the take-up means.

FIG. 1 shows an oscillograph comprising a rack forming an outer case, generally indicated 100. A drawer has a front panel 101 on which are mounted handles 105 by means of which the oscillograph chassis may be slid into or removed from the case 100. Case 100 has a cover assembly 98 mounted on it by means of gusset plates which are screwed to the back side of supporting angle plates in the case. Rack slides 95 mounted to the cover assembly 98 mate with rack slides on the sides of the oscillograph chassis and support the oscillograph so that it can be slid into and out of the case 100. Case 100 contains a spool 99 (FIG. 2) on which a supply of recording paper or film 9 may be mounted.

The paper take-up mechanism is mounted in the case 100 by means of a drawer 111 having rack slides 112 on it which are, in turn, mounted below the oscillograph and hung from it by two plates. Thus, as the oscillograph is moved into and out of the case, the take-up unit moves with it. However, the take-up unit may also be moved into and out of the case independently of the oscillograph. The take-up unit is so arranged that the front of it can never move back behind the front of the oscillograph but it may move out from the front of the oscillograph, as is shown in FIG. 2.

The paper take-up unit has panel 113 on which handles 114 are located so that the drawer 111 may be slid into or out of the case 100. The paper take-up mechanism includes the paper take-up spool 12 (FIG. 2) on which the recording paper may be wound up after the record has been made thereon and after the record has been latensified. In some cases, the take-up spool 12 may not be necessary or desirable. In such cases, the take-up spool 12 may be dispensed with and the recording paper 9 may be permitted to spill from the oscillograph and to fall to the floor or to any convenient receptacle therefor.

On front panel 101 are conventional push buttons or other control devices for turning the electric power on and off, for energizing the recording lamp, for actuating the multi-speed transmission to drive the recording paper 9, for indicating the amount of recording paper remaining on the supply roll, and for varying such factors as frequency of time line printing, intensity of the recording beam or spot, and intensity of grid lines. These control devices include knobs 102, push buttons 103, and long bar 104. Such control devices are well known in the art. A more detailed description of them is believed unnecessary.

Figure 2:
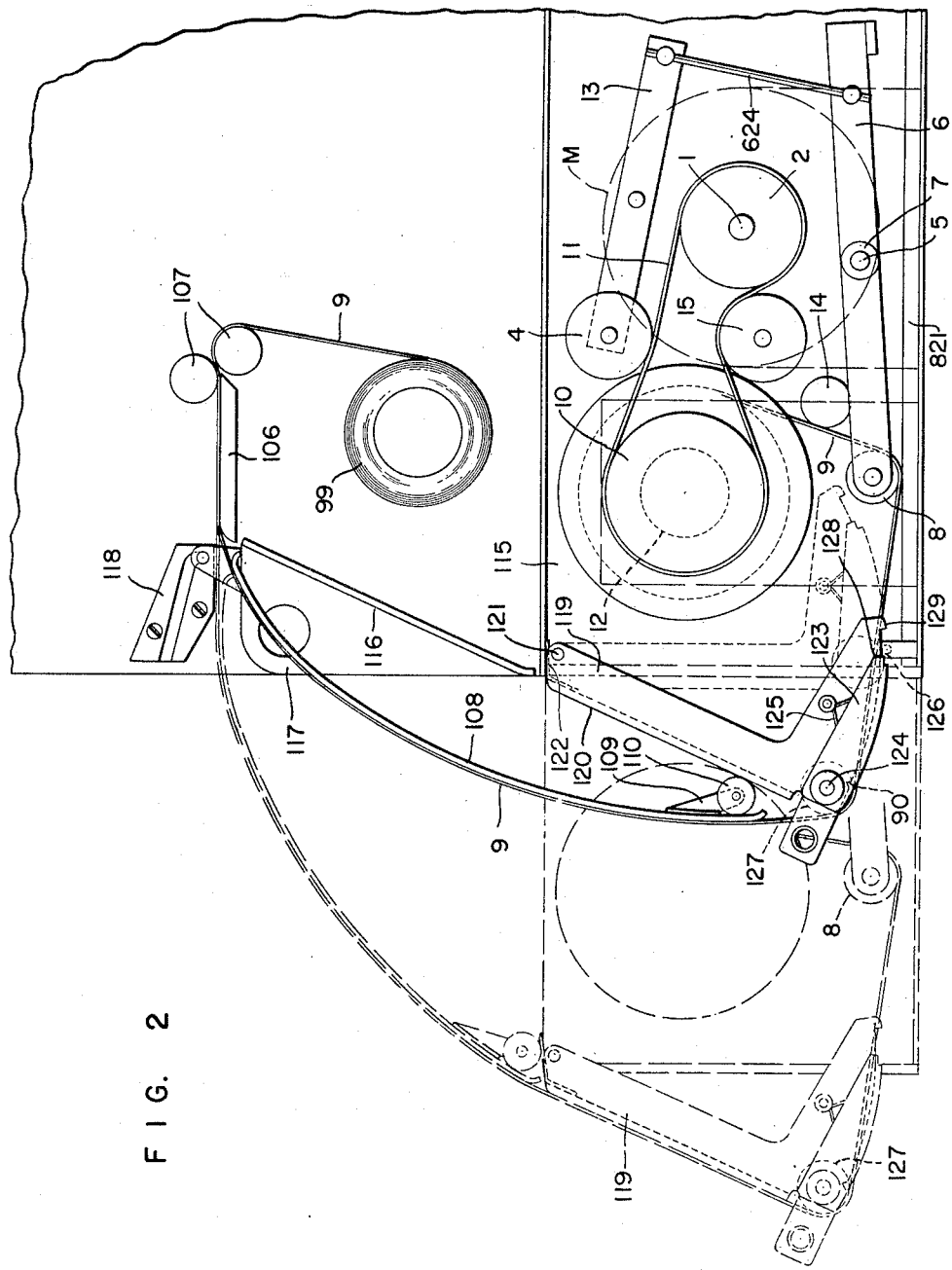
FIG. 2 is a view in longitudinal, vertical, cross section showing recording means, latensifying means, the paper take-up means in solid lines and in various alternative positions in broken lines.

Referring to FIG. 2 it will be seen that the recording paper 9 passes from supply roll 99 between a pair of drive rollers 107 to a recording plane formed by the flat, upper surface of recording platen 106. In the recording plane, the recording paper 9 is exposed to one or more recording beams of radiant energy coming from one or more of the galvanometers (not shown) by means of which one or more beams of radiant energy are caused to traverse the surface of the recording paper 9 at an angle to the direction of movement of the recording paper and to make a record on the paper of the variations with time of any phenomena which may be translated into an electric current and caused to actuate the galvanometer in a manner well known in oscillograph recording.

The oscillograph illustrated in FIG. 2 is open at the front panel thereof thereby permitting access to the recording paper 9 for loading, latensifying, and viewing. If latensification is to be done by heat, recording paper 9 passes from the recording plane above the recording platen 106 over an electrically heated latensifying platen or hot plate 108 having a heat transfer surface over which the recording paper 9 slides in good heat transfer relation. Platen 108 may be made of aluminum plate and is curved and preformed with lateral grooves or slots (not shown) therein. Such slots, if used, extend transversely across the entire width of the platen and are provided to remove gaseous layers which tend to adhere to the surface of the recording paper 9 adjacent the platen 108. The use of such slots insures good thermal contact between the recording paper 9 and the latensifying platen 108, allowing the escape of steam, created by driving the moisture from the recording paper.

Latensifying platen or hot plate 108 is mounted in case 100 by means of a pivot comprised by slotted brackets 118 secured to case 100. At its free end, away from the pivot formed by brackets 118, latensifying platen 108 carries one or more brackets 109 on each of which a rolling magnet 110 is mounted. Rolling magnet 110 holds latensifying platen 108 at its bottom or free end.

Latensifying platen or hot plate 108 is not essential. If latensification is to be done by radiant energy other than heat supplied by platen 108, recording paper 9 passes from the recording plane above the recording platen 106 over writing platen or cross plate 116 (FIG. 2) supported on case 100 and having side plates 117 on either side thereof. The recording paper passes from the cross plate 116 across the surface of a front platen 120, hereinafter referred to.

The front panel 113 of the drawer 111 in which the paper take-up unit is mounted, has a cut away portion 115 in which are mounted a pair of L-shaped side plates 119 connected across the front by a flat front platen 120. Each of L-shaped side plates 119 is pivoted at its upper end by a pivot 121 so that the L-shaped side plates 119 and the front platen 120 may rock out of inclined position, in which these elements are shown in FIG. 2 in full lines, into a vertical position, in which these elements are shown in FIG. 2 in dotted lines. Each of side plates 119 has at its right hand end, as viewed in FIG. 2, a hook 129 adapted to cooperate with case 100 when the side plates 119 are in their inclined position. One or both side plates 119 has, adjacent its left hand end as viewed in FIG. 2, an inverted, V-shaped notch 90 which cooperates with spring loaded ball 126 operating in the vertical direction. Ball 126 engages notch 90 and holds the platen 120 in the vertical or "in" position.

On a pivot 124 on the free or movable end of one or both of the side plates 119 is mounted a latch 123 which is biased for clockwise movement by a spring 125 and which has at its right hand end, as viewed in FIG. 2, a face 128 adapted to engage with a boss on casting 821. When latch 123 is pushed counter-clockwise, it releases front platen 120 so that this platen can then be pushed counter-clockwise into vertical position. Also mounted on side plates 119 and on pivot 124 thereof is a guide roller 127.

Paper 9 passes from supply spool 99 between the pair of drive rollers 107; through the recording plane formed by the upper, flat surface of recording platen 106; over the outer curved surface of the latensifying platen 108 (if platen 108 is used); over the outer, flat surface of front platen 120; and over guide roller 127 to the paper take-up mechanism. When the drawer 111 is in the open position and front platen 120 is in inclined position, rolling magnet 110 engages with the free surface 122 on the upper end of front platen 120 so as to retain latensifying platen 108 in its extending or bridging position. In this position the recording paper 9 passes from latensifying platen 108 over the surface of the front platen 120 before it reaches the guide roller 127.

If platen 108 is omitted, the recording paper 9 passes through the recording plane formed by the upper, flat surface of recording platen 106; over the outer, flat surface of writing platen 116; over the outer, flat surface of front platen 120; and over guide roller 127 to the paper take-up mechanism. This takes place whether the front platen 120 is in the vertical position or the inclined position while the drawer 111 is in its innermost position.

The paper take-up mechanism comprises a motor M which provides the driving mechanism therefor and which may be an electric motor adapted to be connected to a commercially available source of electricity. Motor M has an output shaft 1 on which is mounted a slip clutch comprising in part, a driving pulley or drum 2 which may conveniently be of stainless steel.

Belt 11, which cooperates with drum 2 to form the slip clutch, is trained over the smooth, outer surface of drum 2. Preferably, belt 11 is composed of woven glass fibers impregnated with nylon. Alternatively, belt 11 may be composed of woven "Dacron." "Dacron" is a trademark of the E. I. du Pont de Nemours Company.

Belt 11 drives take-up pulley 10 on which is mounted the paper take-up spool 12. Paper 9 from guide roller 127 and tension-sensing roller 8 is wound up on the spool 12.

Figure 3:
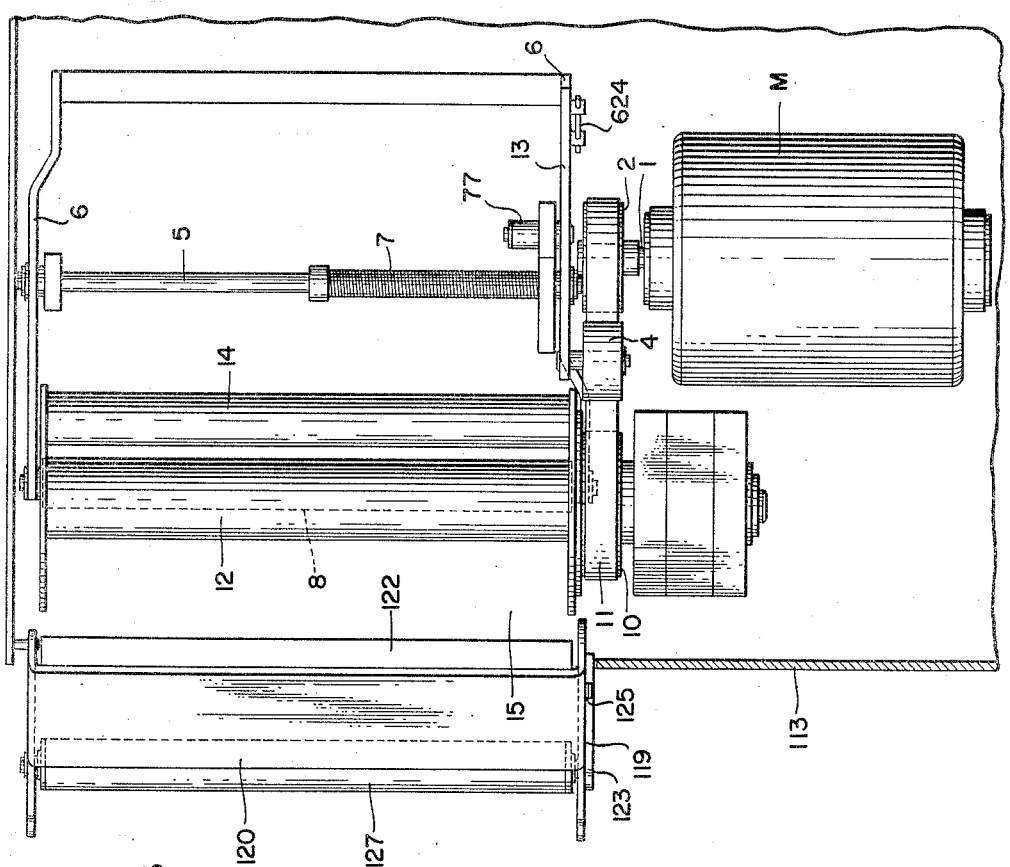
FIG. 3 is a top or plan view of the paper take-up means.

First idler roller 8 bears against paper 9 as it winds up on spool 12. Roller 8, which senses the tension of paper 9, is mounted on a linkage which comprises: a pair of parallel lever arms 6, which are connected by a shaft 5 so as to operate as a unit and which are supported on a stationary pivot. A link 624 has pivotal connections with one arm 6 and with arm 13 at the free end of which is pivotally mounted the control pulley 4. Spring 7 surrounds the shaft 5 which connects arms 6 and is attached, at one end, to case 100 and, at its other end, to shaft 5 and biases linkage 6, 624, and 13 so that first, paper-tension-sensing, idler roller 8 bears against paper 9 and control pulley 4 bears against and operates on the slack side of belt 11. Means 77 (FIG. 3) are provided for adjusting the tension of spring 7 and, consequently, the bias with which paper-tension-sensing roller 8 is stressed against paper 9.

The operation of the oscillograph is as follows: the recording paper 9 is drawn from the supply spool 99 by means of the drive rollers 107 and passes over the recording plane where it is exposed, on its upper surface, to one or more beams of radiant energy. These beams of radiant energy include one or more bands of wave lengths to which the emulsion, with which at least one surface of the recording paper is coated, is primarily responsive. Since these beams of radiant energy fall upon the surface of the paper in a small spot of high intensity, an image of high intensity is produced on the recording paper which produces a latent trace or image due to the movement of the paper and of the beam of radiant energy relative to each other. Paper 9, containing this trace or image, passes from the recording plane over the outer surface of the latensifying platen 108 (if platen 108 is used), and over the outer surface of the writing platen 120, if the writing platen 120 is in its inclined position.

If latensifying platen 108 is not used, paper 9 containing the trace or image passes over the outer surface of writing platen 116.

The latent image or trace is made visible while passing over the platen 108 or over writing platen 116 by latensification by the ambient light, either artifical or natural, surrounding the oscillograph and/or by the heat applied to the recording paper by an electric heater or other heating means which may be applied to the surface of the platen 108 opposite to the surface engaged by the recording paper 9 or which heating means may be located outside case 100. Recording paper 9 then passes over the guide roller 127 and over the tension-sensing idler roller 8 to the paper take-up spool 12.

The speed and torque with which the paper take-up spool 12 is driven is controlled by varying the amount of slippage of belt 11 on the driving pulley by means of the slip clutch formed of the drum 2 and the belt 11. As belt 11 is tightened, it is caused to conform closely to the surface of drum 2 in the area under the belt 11, therefore, to transmit increased torque to take-up pulley 10. Thus, slipping of the pulley against the belt is controlled. Under normal conditions there is continual slipping. At the same time, the excellent slipping properties of the belt 11, which is composed of woven glass fibers impregnated with nylon, and of the drum 2, which is composed of stainless steel, as clutching members, is utilized.

This paper take-up device comprises a mechanical power amplifier with a fairly high gain. For example, a force of one half inch ounces on control roller 3 provides a force for forty inch ounces on take-up spool 12. That is, a relatively small amount of force applied to idler roller 8 by paper 9 can control a relatively large amount of power. This is because of the capstan effect created as the belt 11 wraps around the drum 2, plus the fact that a small amount of force from the control pulley 4 will create a much larger force (tension) in the belt 11. This results from the control pulley 4 acting on a nearly straight portion of the belt 11.

Assume that the tension of paper 9 tends to increase, idler roller 8 pivots clockwise about pivot 5 against the stress of spring 7 and therefore causes control pulley 4 to decrease tension in belt 11. This reduces the torque applied to take-up pulley 10, and, consequently, reduces the paper tension to the desired level as set by the adjustment of spring 7. The reverse also occurs. Thus, the device tends to maintain a constant paper tension.

The angle which the paper 9 takes as it comes off the idler roller 8 changes as the paper 9 winds up on the take-up spool 12. This angle can be maintained constant by the use of a second idler roller 14 between the first idler roller 8 and the paper take-up spool 12.

The amount of surface of belt 11 in contact with the surface of drum 2 or the amount of wrap of the belt around the rim may be increased by the use of the third idler roller 15 located between pulley 10 and drum 2. Idler roller 15 is on a fixed axis and causes a greater amount of the belt 11 to be trained around the surface of drum 2. This increases the capstan effect and, consequently, the gain of the system.

Figure 4:
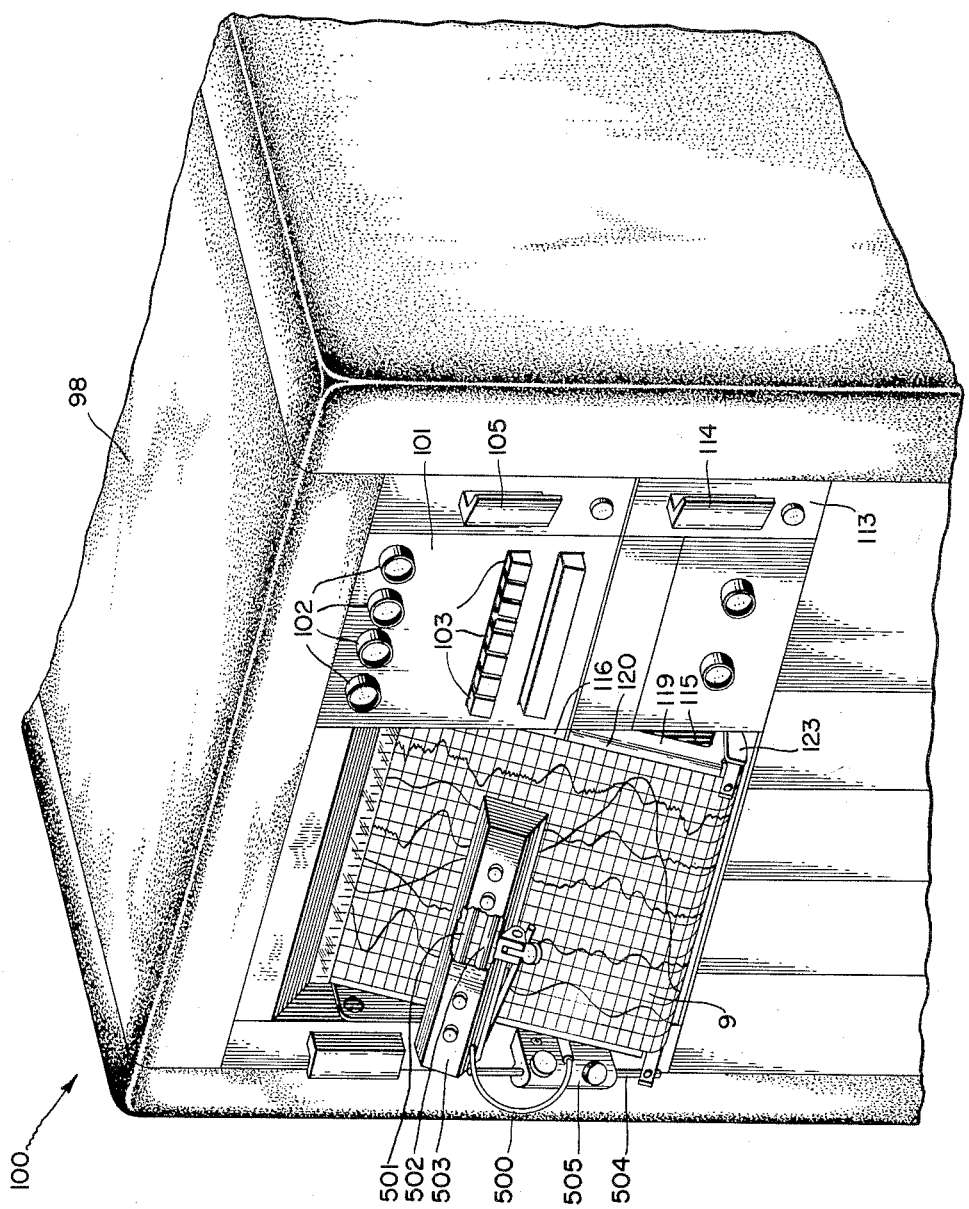
FIG. 4 is a perspective view of recording means, paper take-up mechanism, and latensification means external to the case of the recorder, the latensifying platen or hot plate (hereinafter described in detail) being omitted.

FIG. 4 shows a modification in which rapid latensification of the recording paper is accomplished wihout fogging. In this modification the use of heat and, consequently, the use of the heated platen 108 is dispensed with. Latensification is accomplished by the use of ambient light, either natural or artificial, and/or the use of additional artificial light instead of by means of heat. This additional, artificial light is applied to paper 9 after the image or trace has been recorded thereon by the oscillograph and before the paper is wound up on the paper take-up spool.

The heated, latensifying platen 108 may also be used with the paper take-up device in the "in" position as shown in FIG. 2. Platen 108 then is in the position shown in FIG. 2 in full lines.

In order to supply additional, artificial light a wire 500 (of suitable material to conduct electricity and suitably insulated) leads from the case 100 to one or more fluorescent electric lamps or tubes. One tube, designated 501, provides cool-white light. The other tube, designated 502, provides so-called black light or high intensity ultraviolet radiation. Tube 501 desirably may comprise a General Electric type 14T8CW fluorescent lamp. Tube 502 may comprise a General Electric type F18T8BL fluorescent lamp.

Lamps 501 and 502 are mounted in a shade or reflector 503 which directs the light from the lamp to the recording paper 9 and shields the eyes of the persons in the vicinity of the oscillograph from the light from the lamps. Shade or reflector 503 is mounted on the case 100 by means of a rod 504 and a bracket 505.

When using the heated, latensifying platen 108, the recording paper should first be heated and then exposed to the latensifying radiant energy. This is the reason for keeping the latensifying radiant energy away from the point at which the recording paper issues from the oscillograph. Without the use of the heated, latensifying platen, latensification may start at any point after the latent trace has been applied to the recording paper.

For extremely rapid latensification at paper speeds of from 2 to 8 inches per second, it is important that the direct rays of lamps 501 and 502 should not strike the recording paper 9 nearer than approximately 1 inch below the point at which the paper issues from the case 100. At low paper speed this distance may be less than 1 inch. In this region, extending approximately 1 inch below the exit from the case 100, the recording paper 9 is exposed only to ambient light, either direct or artificial, containing a low intensity of radiations to which the paper is particularly sensitive. At very high paper transport speeds, this interval may be increased to about 2 or 3 inches desirably. The so-called black light from tube 502 should not strike the paper 9 until the latter has been exposed to ambient or indirect light, and additionally, has received the full intensity of white light from the tube 501. With this latensifier arrangement, the radiation from the ambient light and the cool white light from tube 501 serve to expose the recording paper 9 for a short time to low intensity radiation. During this exposure the recording paper 9 may be heated if desired.

Such exposure has been found to inactivate the original recording sensitivity of the recording paper so as thereafter to permit rapid, close latensification of the latent image by high-intensity ultra-violet radiation from the black light tube 502. Thus, a high intensity latensifying radiation defining the same wave lengths for which the recording paper is sensitive for recording the deflections of the galvanometers beams may be used for latensification of the latent recording image or trace with a minimum of fogging. The presence of visible light in the wave length span from 5000 A. to 7000 A., which is cool white light, is also useful for the purpose of viewing the record.

While the latensifier lamps 501 and 502 have been illustrated as comprising a cool white light tube 501 and a black light tube 502 associated with a common reflector, it will be apparent to those skilled in the art that, if desired, each of the tubes 501 and 502 may be mounted in association with a separate and individual reflector and arranged to provide a desired spacing or separation thereof along the length of the recording paper 9 as it moves downward across the face of the oscillograph.

What is claimed is:

1. Oscillographic recording apparatus including,
supporting means for said apparatus,
a supply spool supported by said supporting means to support a roll of record material responsive to radiant energy,
a latensifying platen,
pivot means located adjacent one end of said platen and pivotally securing said platen to said supporting means,
drive means supported by said supporting means to move said record material through a recording plane, in which a record trace is formed on said record material, and thence over said platen,
a drawer slideably supported by said supporting means adjacent said platen,
a front platen supported by said drawer,
a roller pivotally mounted on said latensifying platen adjacent the opposite end thereof and engaging said front platen to cause said latensifying platen to pivot about said pivot means as said drawer is withdrawn relative to said supporting means,
a take-up spool supported by said drawer to receive said record material from said latensifying platen, and
take-up drive means supported by said drawer to drive said take-up spool to wind said record material thereon,
said latensifying platen and said front platen forming a substantially continuous support for said record material when said drawer is withdrawn relative to said supporting means.

2. Apparatus as specified in claim 1,
wherein said roller is permanently magnetized,
and wherein said front platen engaged by said roller is of magnetic material.

3. Apparatus as specified in claim 1,
wherein said supporting means includes a further drawer slideably supported adjacent the first mentioned drawer,
wherein said supply spool, said latensifying platen, and said drive means are supported by said further drawer, and
wherein said drawers are interlocked so that the withdrawal of said further drawer effects the simultaneous withdrawal of said first mentioned drawer, while permitting the withdrawal of said first mentioned drawer relative to said further drawer.

4. Oscillographic recording apparatus including,
a rack forming a case for said apparatus,
a first drawer slideably mounted in said rack,
a supply spool supported by said drawer to support a roll of record material responsive to radiant energy,
a latensifying platen supported by said drawer,
drive means supported by said drawer to move said record material through a recording plane within said drawer, in which plane a record trace is formed on said record material, and thence over said platen,
a second drawer slideably mounted in said rack adjacent said first drawer and interlocked therewith to cause the withdrawal of said first drawer to effect the simultaneous withdrawal of said second drawer, and to permit the withdrawal of said second drawer relative to said first drawer,
a take-up spool supported by said second drawer to receive said record material from said platen, and
take-up drive means supported by said second drawer to drive said take-up spool to wind said record material thereon.

References Cited by the Examiner

UNITED STATES PATENTS

| | | | |
|---|---|---|---|
| 1,093,933 | 4/14 | Jenkins | 242—75.5 |
| 2,580,427 | 1/52 | Heiland | 346—108 |
| 2,742,631 | 4/56 | Rajchman et al. | 340—173 |
| 2,750,575 | 6/56 | Doty et al. | 340—15.5 |
| 2,916,227 | 12/59 | Bowen | 242—75.5 |
| 2,983,250 | 5/61 | Godfrey | 118—401 |
| 3,031,150 | 4/62 | Wiering | 242—45 |
| 3,035,912 | 5/62 | Le Massena et al. | 96—27 |
| 3,038,994 | 6/62 | Nelson et al. | 250—65 |
| 3,061,225 | 10/62 | Huck | 242—75.1 |
| 3,066,299 | 11/62 | Kampf | 96—63 |
| 3,073,215 | 1/63 | Fischer | 346—109 |
| 3,076,967 | 2/63 | Vernois | 346—49 |
| 3,088,824 | 5/63 | Jacobs | 96—63 |
| 3,094,914 | 6/63 | Smith | 95—89 |
| 3,107,138 | 10/63 | Le Massena | 346—109 |

OTHER REFERENCES

Article: Investigation of Print-out Paper, by John H. Jacobs, in Photographic Science and Engineering, vol. 5, No. 1, January-February 1961.

LEO SMILOW, *Primary Examiner.*

LEYLAND M. MARTIN, *Examiner.*